United States Patent [19]

Schmidt et al.

[11] Patent Number: 5,285,197
[45] Date of Patent: Feb. 8, 1994

[54] METHOD AND APPARATUS FOR AUTOMATIC SELECTION OF SCAN RATES FOR ENHANCED VGA-COMPATIBLE MONITORS

[75] Inventors: Thomas J. Schmidt, Milford, N.H.; Richard Atanus, Chicago, Ill.; James F. Murray, Litchfield, N.H.; Arnold J. Smith, Lawrence, Mass.

[73] Assignee: NEC Technologies, Inc., Boxborough, Mass.

[21] Appl. No.: 750,996

[22] Filed: Aug. 28, 1991

[51] Int. Cl.[5] ............................................. G09G 5/12
[52] U.S. Cl. .................................................. 345/213
[58] Field of Search ............... 340/814, 793, 771, 784, 340/723; 382/47; 395/128

[56] References Cited

U.S. PATENT DOCUMENTS

| | | | |
|---|---|---|---|
| 4,574,224 | 3/1986 | Nowaczyk | 315/408 |
| 4,679,091 | 7/1987 | Kikuchi et al. | 358/242 |
| 4,727,362 | 2/1988 | Rackley et al. | 340/703 |
| 4,779,132 | 10/1988 | McBeath et al. | 358/148 |
| 4,916,442 | 4/1990 | Kim | 340/814 |
| 4,990,902 | 2/1991 | Zenda | 340/771 |
| 4,990,904 | 2/1991 | Zenda | 340/771 |
| 4,998,100 | 3/1991 | Ishii | 340/814 |
| 5,111,190 | 5/1992 | Zenda | 340/771 |

Primary Examiner—Jeffery Brier
Attorney, Agent, or Firm—Sughrue, Mion, Zinn, Macpeak & Seas

[57] ABSTRACT

An apparatus for determining a plurality of video signal characteristics including analog video frequency, horizontal sync frequency and vertical sync frequency produced by a graphics controller providing the video signal to a video display monitor, includes a memory storing bits which correspond to a set of operating characteristics of the video display monitor, a first circuit coupled to the memory for producing voltage fluctuations on a line based on the stored bits in response to a signal which corresponds to a command to set the characteristics of the video signal provided to the video display monitor, and a second circuit for sensing the voltage fluctuations so as to permit determination of the set of operating characteristics. The first circuit includes a switch operatively coupled between a video line and ground to allow grounding of the video line based on the bits so as to produce the voltage fluctuations. The second circuit comprises a logic element for detecting the voltage fluctuations. A method for determining the operating capabilities of the video display monitor is also disclosed.

4 Claims, 7 Drawing Sheets

METHOD AND APPARATUS FOR AUTOMATIC SELECTION OF SCAN RATES FOR ENHANCED VGA-COMPATIBLE MONITORS

FIELD OF THE INVENTION

The present invention relates generally to video display terminals for computer systems. More specifically, the present invention relates to an apparatus for automatically setting the characteristics of a video signal supplied to a high resolution video display monitor, which is responsive to a signal generated by the video display monitor that uniquely identifiers the video display monitor's capabilities. A method for controlling the video signal supplied by a computer system so as to provide an optimum video signal with respect to the characteristics of the video display monitor is also disclosed. The disclosed invention is particularly advantageous for video display monitors which automatically respond to input video signals having characteristics with wide predetermined ranges.

BACKGROUND OF THE INVENTION

Video Graphic Array (VGA) monitors, which provide 640X480 pixel resolution, are rapidly becoming the defacto standard of the personal computer (PC) industry. In addition, a large industry segment is advocating video display monitors with higher resolutions, such as 800X600 and 1024X768 pixels. In order to support these above-VGA or Super VGA resolutions, the video display monitor must be compatible with the horizontal sync frequency and vertical sync frequency provided by the graphics controller in the PC. Many video display monitors and graphics controllers are compatible with a plurality of video standards including CGA, EGA, VGA and Super VGA, but are built to default to a particular video standard on powerup. Thus, even though both the video display monitor and the graphics controller may be capable of better than VGA resolution, these components lock themselves into VGA video standards at powerup. In order to access the high resolution capabilities of these components, additional software programming is normally required.

MULTISYNC-type video display monitors are often used in display applications because they automatically adjust to the characteristics of the analog video signal supplied by the graphics controller of the PC. Exemplary U.S. Pat. Nos. 4,574,224 and 4,679,091 disclose a variable rate horizontal deflection system for a video monitor and a multiple scanning type television receiver, respectively. MULTISYNC-type video display monitors provide high resolution, which improves the video image, as well as faster scan rates, which reduce flicker.

The increased performance of MULTISYNC-type monitors creates problems which arise when configuring systems, i.e., matching the video display monitor characteristics to the graphics controller characteristics. Existing VGA monitors provide only limited information to the graphics controller about their capabilities. For example, the graphics controller of the computer system can determine if the video display monitor is color or monochrome, as discussed in greater detail below, and in some instances if the video display monitor is compatible with the 8514 video standard, a high resolution interlaced graphics standard. However, there is no method or apparatus available by which the graphics controller can determine the video display monitor's exact resolution or scan rate characteristics.

Video display monitor control circuits are available which adapt the video display monitor to the characteristics of video signals received from the graphics controller. However, none of these systems include circuitry which provides information about the video display monitor's capabilities to a graphics controller. U.S. Pat. No. 4,916,442 to Kim, for example, discloses precontroller circuitry for controlling vertical amplitude and synchronization signals sent to a video display monitor, where the behavior of the circuitry is based on the frequency and polarity of horizontal and vertical sync signals provided by a computer processor and to the presence or absence of a PGA signal in the input to the precontroller circuitry. This circuitry provides up to three different vertical sync rates and amplitudes as well as logic for distinguishing three different types of IBM-brand video display monitors from one another. U.S. Pat. No. 4,779,132 to MCBeath et al., discloses display monitor circuitry which senses the polarity of horizontal and vertical sync signals and switches the monitor between three different vertical resolutions (350, 400, and 480 horizontal line resolutions). U.S. Pat. No. 4,727,362 to Rackley et al., on the other hand, discloses display monitor circuitry, which detects the polarity of the horizontal and vertical sync pulses sent to the video display monitor and switches the video display monitor between two different graphics modes, corresponding to CGA and EGA modes.

SUMMARY OF THE INVENTION

The principal object of the present invention is to provide a method for communicating the performance capabilities of a video display monitor to the graphics controller of a computer system so as to allow the graphics controller to be automatically configured to the capabilities reported by the video display monitor.

Another object of the present invention is to provide a method for communicating the performance capabilities of a video display monitor to the graphics controller of a computer system while maintaining compatibility with conventional VGA implementations so as to maintain 100% backward component compatibility.

Still another object of the present invention is to provide an apparatus for communicating the performance capabilities of a video display monitor to the graphics controller of a computer system which can be provided at low cost.

Another object of the present invention is to provide a method for communicating the performance capabilities of a video display monitor to the graphics controller of a computer system so as to permit the graphics controller to be set to the maximum horizontal sync frequency, the maximum vertical sync frequency, and the maximum video bandwidth capabilities of the video display monitor to thereby permit the basic input/output system (BIOS) to automatically determine the optimal timing requirements of the graphics controller.

The present invention was motivated by a desire to provide a method and apparatus for communicating the capabilities of a video display monitor to a graphics controller so as to permit automatic determination of the optimal refresh rate used by the graphics controller. In order to determine which refresh rate the graphics controller is to use, the BIOS need three pieces of information, maximum horizontal sync frequency, maximum vertical sync frequency and maximum video bandwidth. With this information, the BIOS can automatically determine the best timing requirements for the graphics controller.

The present invention was also motivated by a desire to maintain compatibility between video display monitors and graphics controllers incorporating the present invention and conventional video display monitors and graphics controllers. In order to achieve the present invention, it was necessary to observe the following system constraints. First, the conventional monitor identification schemes, discussed below, must work correctly, even when the monitor is turned off. Second, pin definitions could not be added or changed. While this constrain is not absolute, adding or changing pin definition increases the risk of future component incompatibility. Third, the detection scheme must be compatible with typical VGA controllers. In addition, both the video display monitors and graphics control systems are very cost sensitive, which necessitates the use of existing hardware as much as possible.

The present invention was also motivated by a desire to provide a generic identification method and apparatus. In other words, the information returned by the video display monitor should be the actual raw information needed by the BIOS to determined the graphics controller characteristics. Therefore, information could not be coded information specific to a particular manufacturer's product line. Using raw information advantageously eliminates the need for updating the BIOS when new video display monitor types are developed, thus the present invention allows for future growth of video display monitor types.

These and other objects features and advantages of the present invention are provided in a computer system having a video display monitor connected to circuitry adapted to provide a video signal having a plurality of video signal characteristics including an analog video frequency, a horizontal sync frequency and a vertical sync frequency, by a method for determining the video signal characteristics which the video display monitor will support. The method comprises the steps of generating a first signal in response to a second signal corresponding to a video display monitor identification command, and sensing the first signal, which corresponds to the maximum video signal characteristics supported by the video display monitor. The first signal can be either an analog or a digital signal. When the first signal is a digital signal, it comprises a plurality of bytes corresponding to the video signal characteristics while the method further comprises the step of storing the bytes prior to the generating step.

According to one aspect of the present invention, the second signal can be either a unique signal of a particular pattern of changes in a signal normally received by the video display monitor. When the second signal is the horizontal sync signal, the generating step further comprises the step of generating the second signal having an oscillating polarity. When the second signal is a video mode change signal, the video display monitor uses a signal generated internally in response to the mode change signal to generate the first signal, which has a predetermined pulse width. In that case, the sensing step comprises determining the pulse width of the first signal. The second signal advantageously can be a unique digital signal. In that case, the first signal comprises a signal having a duration freely selected from a plurality of predetermined durations and the method comprises the step of providing a passive element for setting the duration to a selected one of the predetermined durations.

These and other objects features and advantages of the present invention are provided by an apparatus for selecting one of a plurality of video signal characteristics including an analog video frequency, a horizontal sync frequency and a vertical sync frequency produced by circuitry providing the video signal to a video display monitor, the apparatus comprising a first circuit for generating a first signal responsive to a second signal corresponding to a command to set the characteristics of the video signal provide to the video display monitor, and a second circuit for sensing the first signal so as to permit the second circuit to identify a plurality of operating characteristics of the video display monitor.

According to one aspect of the present invention, the first circuit includes a switch element for grounding a passive network so as to produce the first signal having a plurality of predetermined durations, each of the predetermined durations corresponding to a set of video display monitor characteristics and the second circuit comprises a timer so as to permit the second circuit to determine the duration of the first signal. The passive network comprises a resistor disposed in the video display monitor but coupled to a capacitor in a graphics controller so as to permit the capacitor to be charged and discharged responsive to operation of the switch element. According to one embodiment of the present invention, the switch element is a transistor and the second signal is a digital signal.

According to another aspect of the present invention, the first circuit comprises a memory storing a plurality of bits corresponding to the characteristics of the video display monitor, and the memory outputs the bits responsive to changes in a selected characteristic of a horizontal sync signal corresponding to the second signal. The selected characteristic may be polarity. The first circuit advantageously can further comprise a switch operatively coupled to a video line of the video display monitor and to ground so as to permit grounding of the video line in response to the bits output by the memory. In addition, the second circuit comprises a logic element for detecting the bits.

According to yet another aspect of the present invention, the first circuit comprises a monostable element having a predetermined cycle time which corresponds to one of a plurality of sets of operating characteristics of the video display monitor. In this case, the monostable element switches from a first state to a second state and back to the first state in response to the second signal.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted throughout with like or similar numbers, and in which.

DESCRIPTION OF THE PREFERRED EMBODIMENTS

Figure 1:
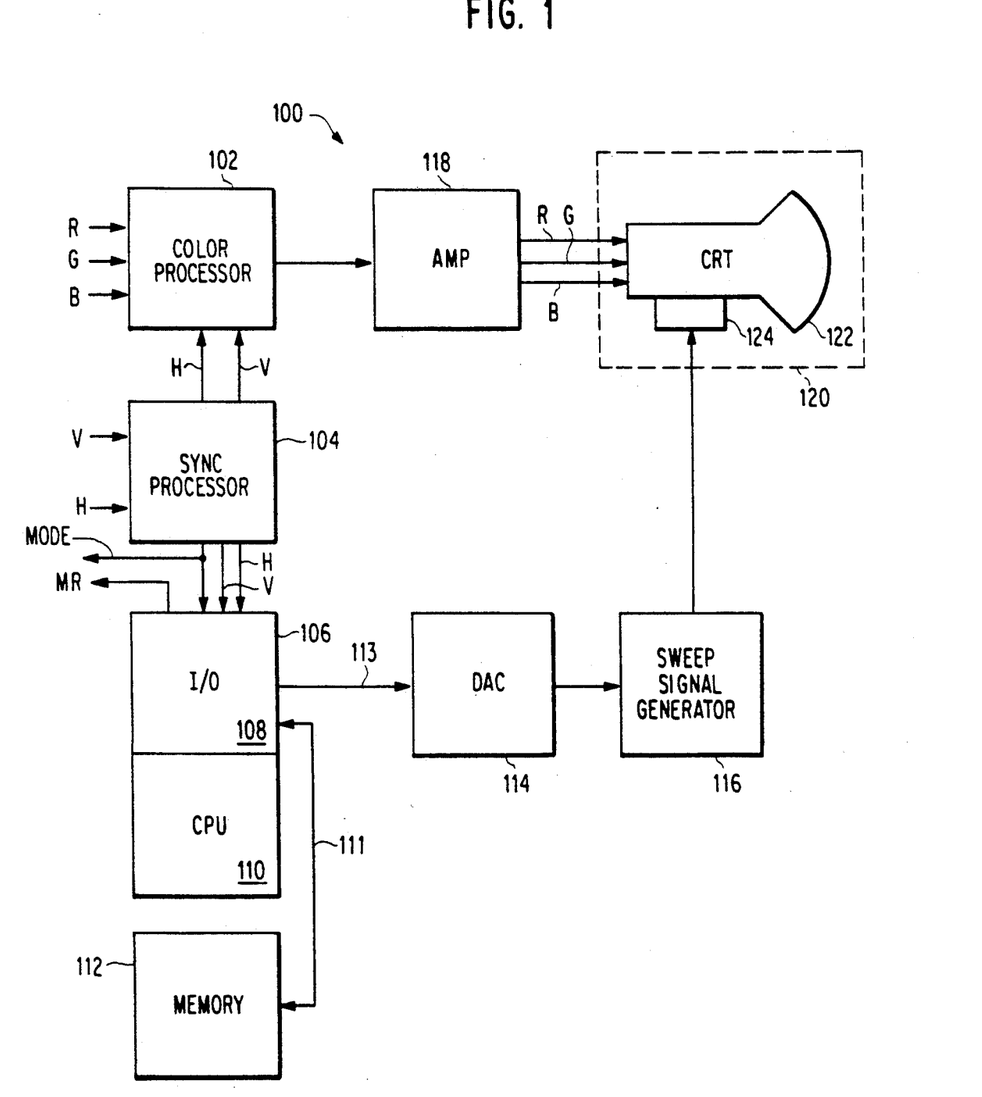
FIG. 1 is a block diagram of a typical video display monitor controller according to the present invention.
Figure 2:
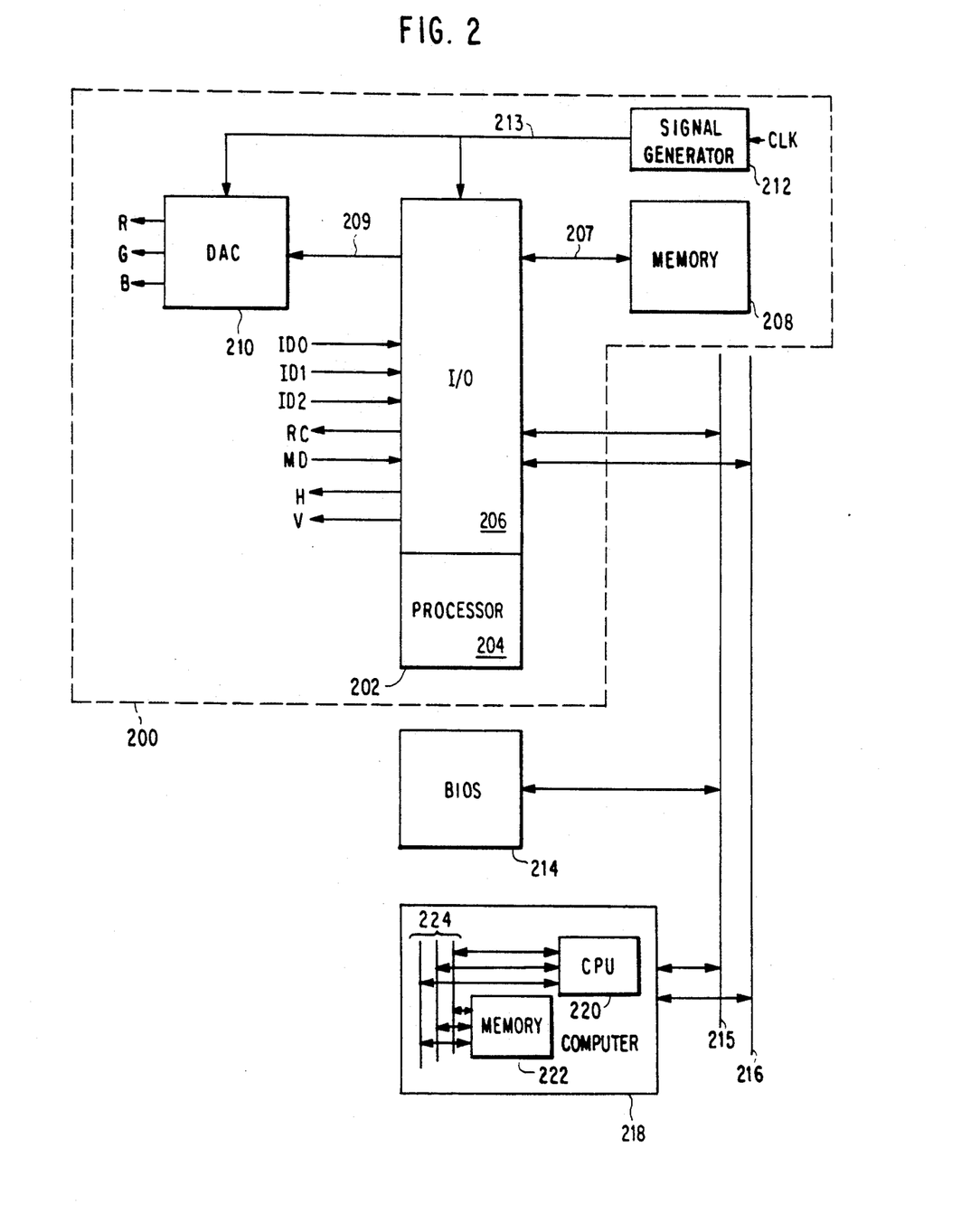
FIG. 2 is a block diagram of a typical graphics controller according to the present invention.

The preferred embodiments according to the present invention will be discussed with reference to FIGS. 1 and 2, wherein FIG. 1 is a high level block diagram of the video display monitor 100 and FIG. 2 is a high level block diagram of the graphics controlled 200, which is shown with respect to selected portions of a typical computer system.

As shown in FIG. 1, video display monitor 100 comprises a color processor 102 receiving RGB video signals from a graphics controller 200, discussed in detail below, and a sync signal processor 104 receiving horizontal and vertical sync signals from graphics controller 200. Color processor 102 advantageously provides video signals to a CRT unit 120, which includes a CRT 122 as well as control circuitry 124, via a video amplifier 118. Sync signal processor 104 provides vertical sync signals and horizontal sync signals to both color processor 102 and a monitor microprocessor 106, which advantageously includes an input/output (I/O) device 108 and a monitor processor 110. Preferably, sync signal processor 104 includes mode change detection functions and provides a mode change detect signal MODE to microprocessor 106. Processor 110 advantageously is connected via buses 111 and 113 to a memory 112 and a digital-to-analog converter (DAC) 114, respectively. Preferably, memory 112 is a read only memory (ROM), although it will be noted that other memory devices may advantageously be used. It will be appreciated that processor 110 provides digital control signals to DAC 114 via bus 113. The analog output of DAC 114 is advantageously provided to control circuitry 124 via a sweep signal generator 116.

It will be noted that I/O 108 advantageously is connected to provide a monitor response output signal over line MR. It will be appreciated that line MR may be advantageously connected to the MODE line between sync signal processor 104 and microprocessor 106 so as to permit the mode change detect signal to act as the monitor response signal, as discussed in greater detail below.

The graphics controller 200, illustrated in the block diagram of FIG. 2, includes a video microprocessor 202, which advantageously includes a video processor 204 and I/O device 206, a DAC 210 for generating RGB video signals and a timing signal generator 212. Timing signal generator advantageously receives a clock signal CLK and provides a plurality of timing signals to microprocessor 202 and DAC 210 via a timing bus 213. DAC 210 is advantageously connected via bus 209 to receive digital signals from processor 204 via I/O 206. Microprocessor 202 is advantageously connected to memory 208 via a bus 207 providing both address and data interchange. Microprocessor 204 is also connected to address bus 215 and data bus 216 to permit communication between computer BIOS 214 and a computer mother board 218, which includes the computer's central processing unit 220 and system memory 222. It will be appreciated that BIOS 214, processing unit 220 and memory 222 all cooperate with graphics controller 200 to provide monitor type detection. It will also be apparent that once monitor type detection is complete, BIOS 214, processor unit 220 and memory 222 advantageously cooperate to set the performance characteristics of graphics controller 200, based on the type of monitor 100 detected. In this way, the graphics display of the computer system advantageously can be configured to the highest resolution level supported by both monitor 100 and graphics controller 200.

Those of ordinary skill in the art will appreciate the BIOS is often referred to as firmware, i.e., hardware used for nonvolatile storage of instructions or data that can be read only by the processor unit. It will also be noted that while the processor units are typically selected from the Intel 80X86 or Motorola 68XXX chip families, the present invention is not limited to PC's using a processor unit belonging to one of these families.

It will be noted that I/O 206 includes a plurality of ports connected to output lines H and V, for providing horizontal sync signals and vertical sync signals to monitor 100, as well as input lines ID0, ID1, ID2 and MD. Input lines ID0, ID1 and ID2 provide identification signals for distinguishing between monochrome and color video display monitors in the conventional manner, discussed in greater detail below, while line MD provides for transmission of monitor detect signals according to the present invention under the control of BIOS 214. In addition, an output line RC is provide to permit I/O 206 to output a selected digital signal, discussed below. It will be appreciated that graphics controller 200 is compatible with both conventional video display monitors as well as the monitor 100 illustrated in FIG. 1. It will also be apparent that graphics controller 200 may be provided as a stand alone printed circuit board or may be included as part of the computer's motherboard. Typically, microprocessor 202 may be a TSENG ET4000 video processor or a Western Digital WD 90C11 video processor, although other video processors advantageously can be used.

Before discussing the preferred embodiments of the present invention shown in FIGS. 4–7, a brief discussion of conventional video display monitor identification methods will be described with reference to FIG. 3.

A conventional VGA display receives analog video signals wherein each of the three colors (RED, GREEN BLUE) can assume an infinite number of colors. Graphics specifications established by IBM Corp. require video system components to support either two (VGA), or three (8514) ID lines which are used to determine the type of video display monitor attached to the graphics controller. Selected portions of typical video display monitor circuitry and graphics controller circuitry connected via a pair of interface connectors including male and female connectors M and F, respectively, are illustrated in FIG. 3. It will be appreciated that the configuration illustrated in FIG. 3 is for a color video display monitor. In a monochrome video display monitor, the connections at pins 11 and 12 on the video display monitor side of connector M would be reversed.

Figure 3:
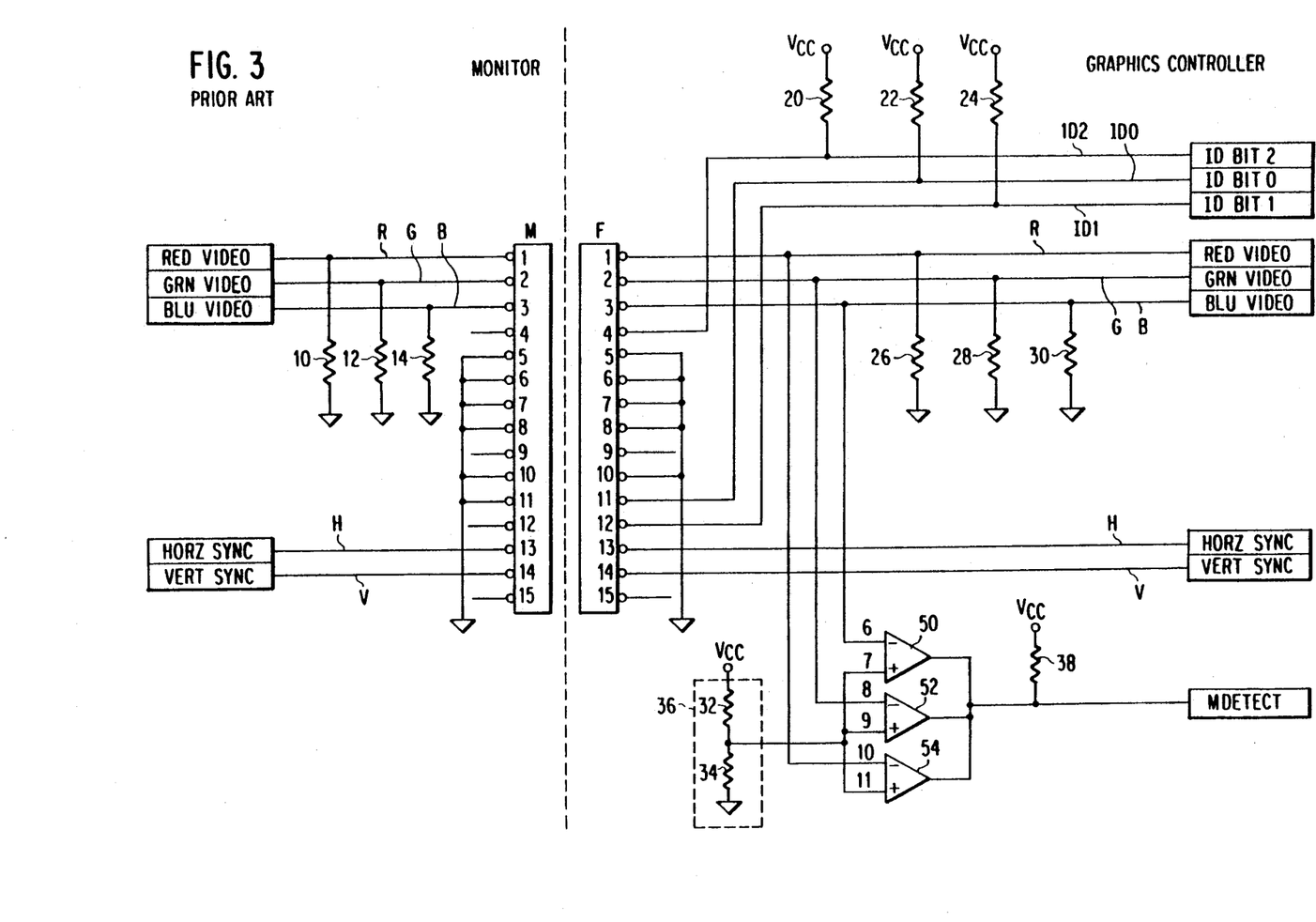
FIG. 3 is a schematic illustration of selected portions of conventional connection circuitry between the video display monitor of FIG. 1 and the graphics controller of FIG. 2 for explaining conventional video display monitor identification.

On the monitor side of FIG. 3, red, green and blue video lines R, G and B, respectively, are connected to pins 1, 2 and 3 in that order. Each video line is connected to a corresponding terminating resistor 10, 12 and 14. Pins 13 and 14 are connected to horizontal sync line H and vertical sync line V, respectively. Pins 5–8, 10 and 11 are connected to ground while the remaining pins are not connected. On the graphics controller side of the connector F, similar connections are made. In addition, ID lines ID0, ID1 and ID2 are connected to pins 11, 12 and 4, in that order. In addition, differential comparators 50, 52 and 54 are connected to lines R, G and B, respectively. (Identical line notations are used for lines carrying identical signals on both sides of the connectors M and F.)

Conventional graphics controllers use two different methods to determine the type of video display monitor attached to the graphics controller, the state of the ID lines on the interface connector F or the voltage levels on the video lines R, G and B.

When ID lines are used, three signals are defined on the 15 pin VGA connector M which indicate video display monitor type. These signals are simple logic lines which are pulled up in the graphics controller on the computer side of connector F, and which are either not connected or tied to ground on connector M. The video BIOS 214 reads lines ID0, ID1 and ID2 at powerup and configures the graphics controller according to the values determined, as shown in Table 1 below.

TABLE 1

|  | ID 2 | ID 1 | ID 0 |
| --- | --- | --- | --- |
| Mono | N/C | GND | N/C |
| Color | N/C | N/C | GND |
| 8514 | GND | N/C | GND |

The type of video display monitor can also be determined by the video level method, in which voltage comparators, i.e., differential comparators 50, 52 and 54 measure the voltage of the lines connected to pins 1, 2 and 3, i.e., the voltage levels of the R, G and B video signals. The threshold of each differential comparator is set to a predetermined value by a biasing network 36, which includes resistors 32 and 34, so that the differential comparators can detect monitor loading of about 325 millivolts (mV) on the video lines. Since each of the video lines R, G and B is terminated with a 75 ohm resistor on the monitor side, i.e., resistors 10, 12 and 14, removing the termination causes the voltage to increase.

The video portion of BIOS 214 performs two tests in order to determine monitor type. First, it turns off the GREEN and RED signals and drives BLUE to 200 mV. If BIOS 214 detects monitor loading, it knows a color monitor is attached, since monochrome monitors generally provide the video signal on the Green line. If a color monitor is not attached the BIOS 214 turns off the RED and BLUE signals and drives GREEN to 200 mV. If the differential comparator 52 detects monitor loading, it knows that a monochrome monitor is attached. If BIOS 214 detects neither, it assumes the monitor is not connected.

The preferred embodiments of the present invention will now be explained while referring to FIGS. 4–7.

Figure 4:
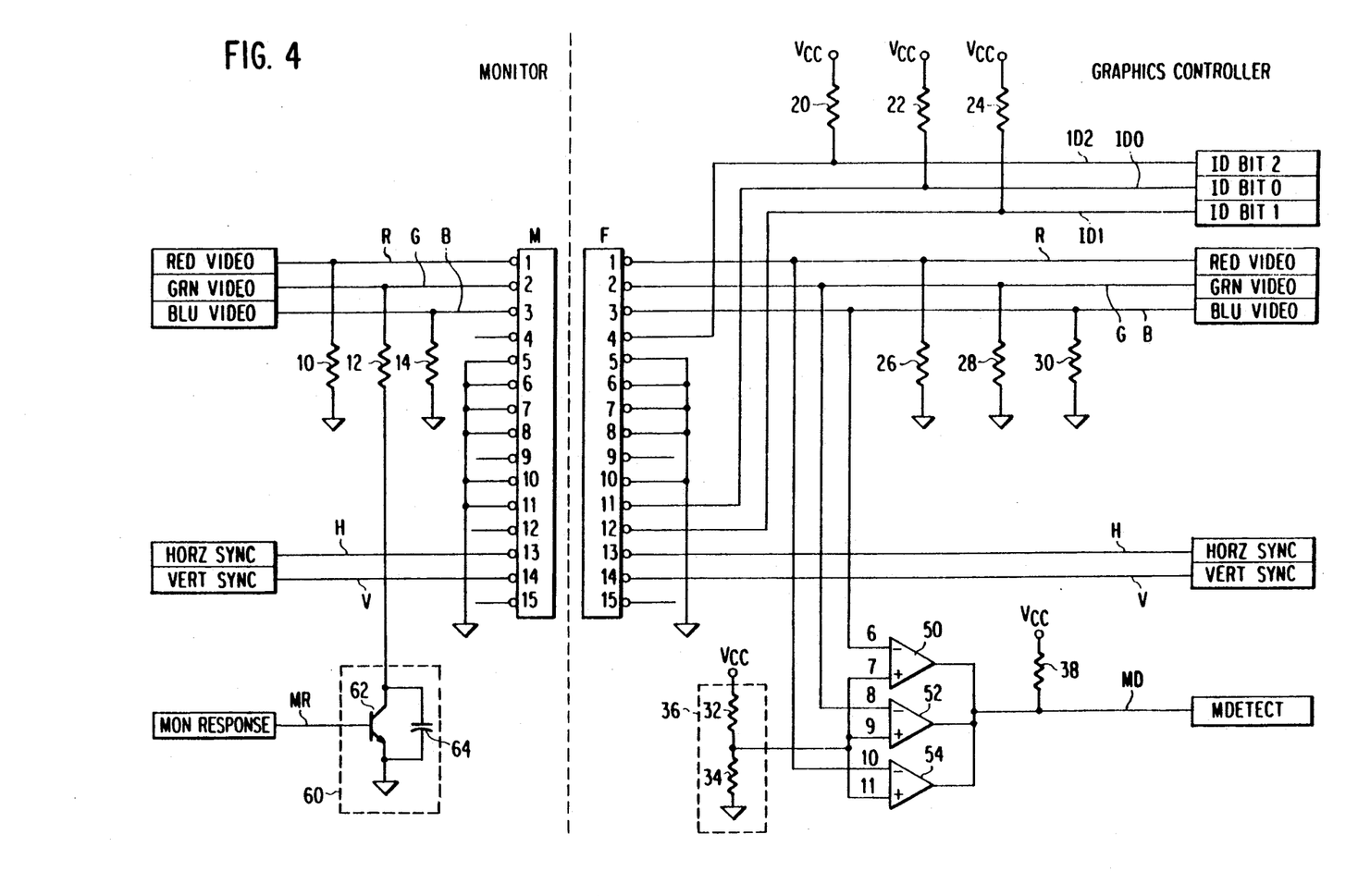
FIG. 4 is a schematic diagram illustrating connection circuitry between the video display monitor of FIG. 1 and the graphics controller of FIG. 2 for explaining the operation of a preferred embodiment of the present invention.

According to a first preferred embodiment of the present invention shown in FIG. 4, biasing resistor 12 is connected to ground via a switch element 60, which is operated by a monitor response signal supplied to switch element 60 via line MR connected to I/O 108. Preferably, switch element 60 includes a transistor 62 providing a switching function and a capacitor 64. It will be apparent that switch element 60 may comprise a relay or other switching device responsive to the monitor response signal provided by I/O 108.

Monitor detection and identification operations according to this preferred embodiment of the present invention is initiated during powerup of the computer system. Instructions from system BIOS 214 turn off RED and Blue video signals to lines R and B and set the voltage level of the Green video signal on line G to about 200 mV. A standard VGA compatible timing mode is then set in the microprocessor 202. BIOS 214 then waits for a new frame to begin, which is indicated by the vertical sync signals. Following the vertical sync signals output on line V, microprocessor 202 toggles the polarity of the horizontal sync signals on every horizontal line to produce a signal indicative of a command to monitor 100 to respond with its operating parameters It will be appreciated that horizontal sync signal polarity changes are a standard feature provided by graphics controllers, and further discussion of this feature is not provided. It will also be apparent that the polarity of vertical sync signals and horizontal sync signals is changed only when a mode change is required and that polarity changes are not produced on a line-by-line basis. This advantageously insures that normal usage is unlikely to trigger the video display monitor identification function in monitor 100.

Microprocessor 106 counts the number of polarity changes within each vertical frame. If the monitor counts more than 64 changes in a frame, it enters the Parameter Response Mode (PRM). It should be noted that the monitor 100 should not try to count all polarity changes. Using a predetermined count threshold, i.e., 64, advantageously provides for some timing variations between graphics controller 200 and monitor 100.

When monitor 100 enters PRM, the microprocessor 106 waits for receipt of the next vertical sync pulse. After the vertical sync pulse is detected, the microprocessor 106 outputs a plurality of bits, with one bit being output for each horizontal sync signals received. It will be apparent that each bit must be stable until the next horizontal sync pulse so that the graphics controller 200 has sufficient time to read the bit. Preferably, one bit is output every 25 microseconds (μs), which advantageously is adequate time for graphics controller 200 to sample each bit.

It will be appreciated that memory 112 of monitor 100 includes the plurality of bits used to identify the video display monitor type to the graphics controller 200, with the bits being grouped into a plurality of bytes. It will also be apparent that the video processor 108 shifts the most significant bit of byte 0 out first. After the byte 0 is output, then bytes 1, 2, 3 . . . , are output until all bytes needed to identify the video display monitor type are output to monitor response line MR. In this way, a stream of serial data corresponding to the plurality of bytes are output by monitor 100. The data content of these bytes is discussed in greater detail below.

The monitor 100 drives the serial bits out on the green video line G by turning off the ground on biasing resistor 12 using switch element 60, which cause the voltage on line G to vary over a range of about 200 mV to 400 mV.

Once the monitor 100 enters PRM, the monitor 100 repeats the response 4 times to improve read performance since, even if either the graphics controller 200 or monitor 100 misses a vertical sync pulse, the bytes will still be delivered properly.

On the system side, BIOS 214 waits for the next vertical sync pulse and then polls the port of I/O 206 connected to line MD, which is the line used in determining monitor type. It will be noted that a new bit is clocked in to I/O 206 for each horizontal sync pulse. When monitor 100 provides a 70 Hz scan rate, transmission of the bytes from monitor 100 and subsequent detection of these bytes advantageously adds only 72 ms to the conventional mode change time. It will be appreciated that each bit recovered during the polling process is converted to parallel bytes for storage. Preferably, these bytes are stored in an unallocated portion of reserved system memory 222 under the control of processor unit 220. Most preferably, these bytes are stored in the portion of memory 222 reserved for keyboard (not shown) data.

Figure 5:
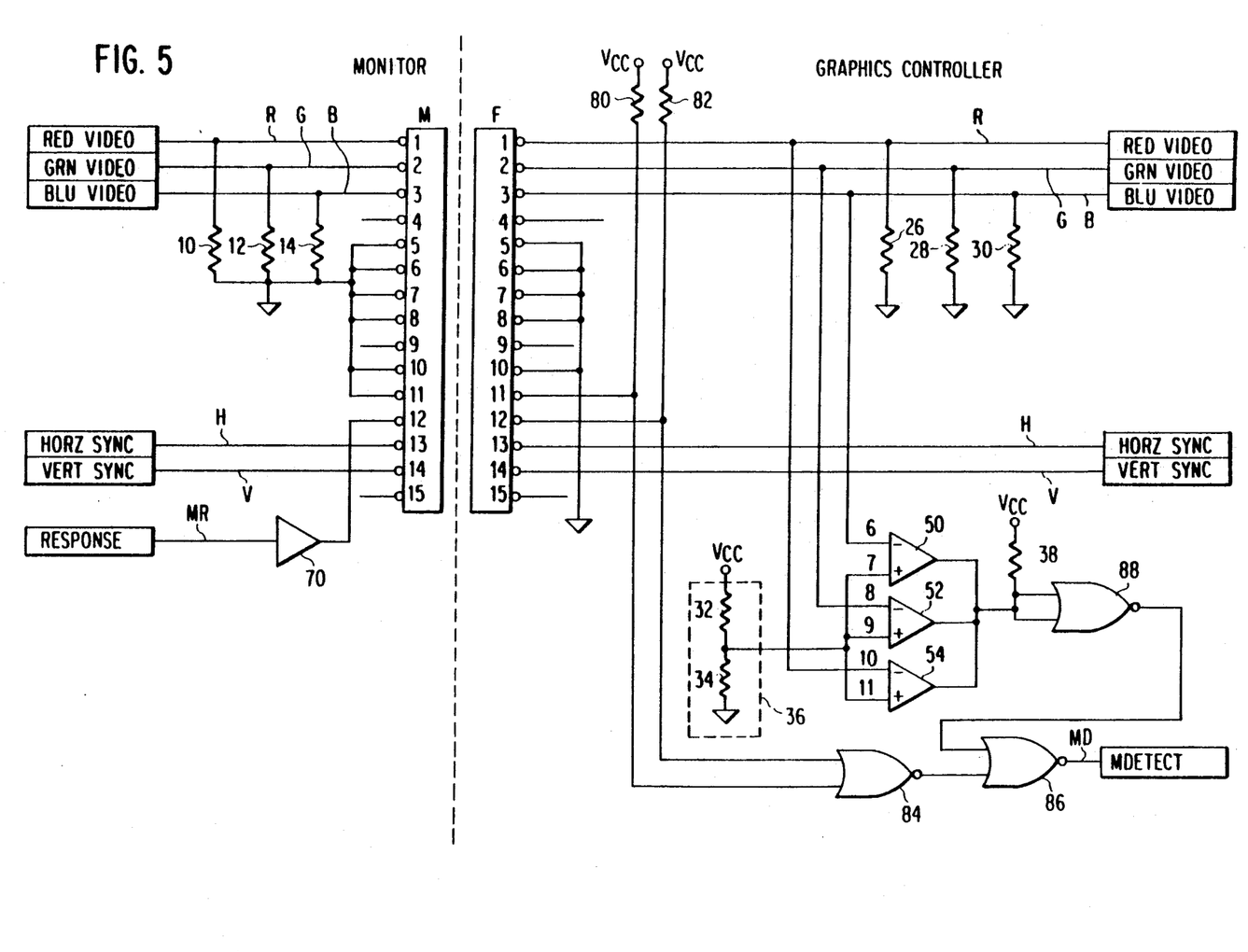
FIG. 5 is a schematic diagram illustrating connection circuitry between the video display monitor of FIG. 1 and the graphics controller of FIG. 2 for explaining the operation of another preferred embodiment of the present invention.

Another preferred embodiment of the present invention is shown in FIG. 5, which is similar the embodiment illustrated in FIG. 4. Thus, only the differences between FIGS. 4 and 5 will be discussed. As shown in FIG. 5, the line MR is connected to an open collector buffer, which advantageously provides a N/C indication to graphics controller 200 when monitor 100 is not energized. It will be apparent that device 70 advantageously allows monitor 100 to provide responses which indicate that the monitor 100 is not connected, thus satisfying conventional monitor identification functions. On the system side of FIG. 5, NOR gates 84 and 88 are connected to the lines ID0, ID1 and the combined output of differential comparators 52, 54 and 56, respectively. NOR gate 86 receives the outputs of NOR gates 84 and 88 and outputs a TTL signal to line MD.

According to the preferred embodiment of the present invention shown in FIG. 5, during powerup, BIOS 214 turns off all three colors and blanks the monitor 100 and then selects a standard VGA compatible timing mode. BIOS 214 waits for a new frame to begin, as indicated by the vertical sync signals and then toggles the polarity of horizontal sync signals for each horizontal line. Monitor 100 counts the polarity changes within a vertical frame and enters PRM when at least 64 counts/frame are received. It will be noted that these initial steps are the same as those discussed above.

After monitor 100 enters PRM, microprocessor 106 waits for the next vertical sync pulse and then outputs the bytes one bit at a time, in the same manner as discussed above. However, in this case line MD is connected to buffer 70, thereby providing each bit to either pin 11 or 12. It will be apparent that color monitors drive the ID1 line while monochrome monitors drive ID0 due to pin configuration differences between the monitor types. It will also be noted that FIG. 5 illustrates the pin configuration for a color monitor.

As shown on the system side of FIG. 5, lines ID0 and ID1 are OR'ed together. It will be apparent that only one of these lines is actually receiving the transmitted bits, thus the other line will be low. It will also be noted that, since lines ID0 and ID1 are OR'ed together, a high TTL signal is provided to I/O 206 when monitor 100 is operating in any mode other than PRM. PRM data is sent from monitor 100 on the ID line which is normally high. By OR'ing the lines ID0 and ID1 together, graphics controller 200 supports either monochrome or color monitors. It will also be apparent that the outputs of differential comparators 50, 52 and 54 are provided to the same port of I/O 206 as NOR gate 84, thus allowing the differential comparators and PRM to share the same input port.

After BIOS 214 steps through the horizontal polarity changes which initiate PRM, it waits for the next vertical sync pulse and then samples the port of I/O 206 corresponding to line MD for signals corresponding to the transmitted bytes of data.

It will be appreciated that in the preferred embodiment shown in FIG. 5, the NOR gate 86 advantageously provides graphics controller 200 with a multiplexer function, which allows port sharing on I/O 206 between the existing differential comparators 50, 52 and 54 and the bits on lines ID0 and ID1. It will also be appreciated that the embodiment of FIG. 5 requires pullup resistors 80 and 82 for lines ID0 and ID1. Ferrites and noise suppression capacitors (not shown) advantageously can also be provided.

Monitor 100 advantageously includes one output port on I/O 106 connected to buffer 70 via line MR. Preferably, buffer 70 does not load down the ID line to which it is connected when monitor 100 is turned off. This advantageously maintains compatibility with existing graphics controller systems even when the video display monitor is off. A ferrite and capacitor (not shown) advantageously can be provided for better noise reduction.

According to the preferred embodiments discussed above, BIOS 214 provides an indication to monitor 100 to initiate PRM by oscillating the polarity of the horizontal sync signals. In addition, BIOS 214 advantageously monitors horizontal sync pulses in order to shift out each received bit to processor unit 220 for storage in memory 222 every 32 μs and contains configuration tables to select the desired operating parameters for graphics controller 200 when PRM has been completed. The additional firmware in BIOS 214 advantageously can be added to conventional firmware with an increase of about 1000 bytes. In addition, monitor 100 firmware advantageously includes code for counting polarity changes in horizontal sync signals within each frame, as well as code for monitoring horizontal sync pulses in order to shift out the bits in the correct timing sequence. It will be appreciated that monitor 100 firmware advantageously includes the bytes transmitted during PRM. The additional firmware in monitor 100 advantageously is provided while increasing the total firmware by only about 500 bytes of code.

Preferably, the data structure of the bytes transmitted by the preferred embodiments discussed with respect to FIGS. 4 and 5 are identical. Since a bit is shifted for each horizontal line, the maximum size of the response, in VGA mode, is 400 bits (50 bytes). It will be appreciated that for higher resolutions the number of bits transmitted per frame can be increased up to the maximum number of lines. The data structure is shown in Table 2.

TABLE 2

| BYTE | BIT | DENOTES | SIZE |
|---|---|---|---|
| Byte 0 | 0–4 | Number of bytes to follow | (5 bits) |
| | 6–5 | Reserved (Must be 0) | (2 bits) |
| | 7 | PRM Flag (Must be 0) | (1 bit) |
| Byte 1 | | Checksum (Simple 8 bit) | (8 bits) |
| Byte 2 | | Feature byte | |
| | 0 | Portrait or landscape display | (1 bit) |
| | 1–7 | Reserved (must be 0) | (7 bits) |
| Byte 3 | | Video rate (0–256 MHz) | (8 bits) |
| Byte 4 | | Horizontal sync (0–256 kHz) | (8 bits) |
| Byte 5 | | Vertical sync (0–256 Hz) | (8 bits) |

The advantages of the data structure shown in Table 2 will be apparent from the discussion immediately below.

Byte 0 advantageously allows changes to the packet size without requiring changes to earlier versions of video display monitors and graphics controllers incorporating the present invention. That is, the data structure according to the present invention allows for later improvements without producing obsolescence of existing systems or monitors. The five bit field limits the packet size to 33 bytes. Bit 7 of byte 0 advantageously provide BIOS 214 with an easy way to determine if the monitor supports PRM, i.e., if bit 7 is not a 0, the video display monitor does not support this feature.

Byte 1 advantageously provides a checksum for confirming that the data, i.e., transmitted bits, are valid. Preferably, the size byte (Byte 0) is not included in the checksum.

Byte 2 provides a list of features provided by monitor 100. Preferably, all bits in byte 2 default to zero, but, if the feature is supported, the bit 0 is set to one. This advantageously provides structure for maintaining backward compatibility while at the same time providing listings of new features as they are developed.

Byte 3 advantageously provides an indication of the maximum video rate or video bandwidth, in megahertz (MHz) which monitor 100 supports, while byte 4 provides a statement of the maximum horizontal sync frequency, in kilohertz (kHz), supported by monitor 100. Preferably, the minimum horizontal sync frequency is 31.5 kHz, the horizontal sync frequency for standard VGA monitors. Frequencies between 31.5 kHz and the maximum horizontal sync frequency advantageously can be supported, while gaps in the overall horizontal sync frequency range are not allowed.

Byte 5 provides the maximum vertical sync frequency, in hertz (Hz), supported by monitor 100, which preferably is at least 56 Hz. All frequencies between 56 Hz and the maximum vertical sync must be supported, i.e., holes in the vertical sync capability are not allowed.

Figure 6:
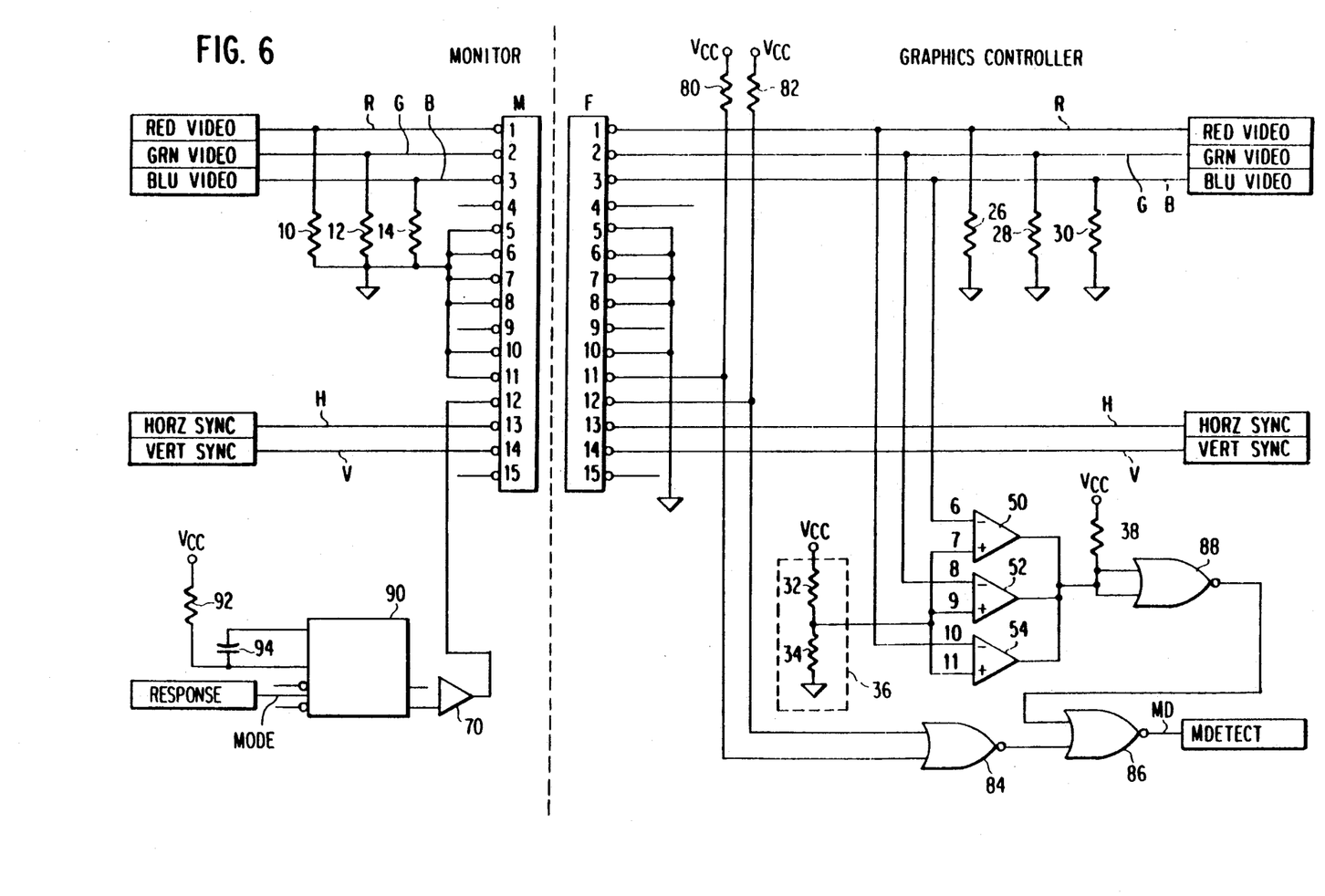
FIG. 6 is a schematic diagram showing connection circuitry between the video display monitor of FIG. 1 and the graphics controller of FIG. 2 for explaining the operation of yet another embodiment of the present invention.

Another preferred embodiment according to the present invention is shown in FIG. 6. Monitor 100 includes a monostable element 90 receiving an input from line MR and providing an output to buffer 70. It will be appreciated that line MR according to this embodiment is connected to line MODE, which is connected between sync processor 104 and I/O 108, as discussed above so that element 90 advantageously is triggered by signalling a mode change to monitor 100. The graphics controller side of the embodiment of FIG. 6 is identical to the embodiment shown in FIG. 5. However, for reasons discussed below, the output of NOR gate 86 in FIG. 6 is interpreted differently by BIOS 214 than the output of NOR gate 86 in FIG. 5.

During system initialization, BIOS 214 blanks the display and then sets a new video mode, i.e., dot clock, sync polarity, etc., to indicate a video mode change. When sync processor 104 detects the video mode change it enters the MODE CHANGE state, which sets line MODE high. Since line MR is coupled to line MODE, a signal for triggering monostable element 90 is provided. Monostable element 90 advantageously is set to produce a pulse having a predetermined width, i.e., duration, thus element 90 sends a predetermined width pulse to graphics controller 200 via one of the ID lines. The pulse width advantageously provides an indication of monitor 100's capabilities, thereby identifying the monitor type.

On the graphics controller side of FIG. 6, lines ID0 and ID1 are logically combined by NOR gate 84. The output of NOR gate 84 is logically combined with the output of NOR gate 88. BIOS 214 keeps video blanked during the mode change, which advantageously allows the state of the ID lines to be read on the port of I/O 206 connected to line MD. It will be apparent that this eliminates the need for one or more additional input ports.

It will be appreciated that when BIOS 214 initiates the mode change, it subsequently monitors the port of I/O 206 to which NOR gate 86 is connected via line MD. When a low level signal is detected, indicating the presence of the pulse provided by monostable element 90, the I/O 206 port is repetitively sampled and a firmware counter is incremented each time the low level signal is sensed at this port. Advantageously, either the number of counts or the pulse width, determined by multiplying the number of counts by the sampling periodicity, can be used to identify the capabilities of monitor 100 according to this preferred embodiment of the present invention.

Preferably, when BIOS 214 initiates the mode change, it sets a watchdog timer to determine if monitor 100 is driving lines ID0 and ID1 via monostable element 90. If monitor 100 does not drive the line ID0 or ID1 within a predetermined period of time, BIOS 214 determines that the video display monitor does not include this preferred embodiment of the present invention.

The output pulse width produced by monostable element 90 provides an indication of monitor 100's capabilities. Preferably, the pulse width is selected from Table 3, which provides exemplary matching between pulse width and a plurality of video display monitor operating capabilities. The pulse widths in Table 3 advantageously provide a +/−20% timing tolerance, with the error budget being split equally between monitor 100 and graphics controller 200 in order to provide a robust indication of video display monitor capabilities. Each timing decade advantageously supports six different video display monitor types, which, given reasonable timing constraints, advantageously support twelve different video display monitor classes.

TABLE 3

| Pulse Width | Meaning BW | HSF | VSF |
|---|---|---|---|
| .56 ms | 75 MHz | 31–38 kHz | 55–90 Hz |
| | | 47.5–49 kHz | |
| .82 ms | 75 MHz | 27–57 kHz | 55–90 Hz |
| 1.20 ms | 100 MHz. | 27–65 kHz | 55–90 Hz |
| 1.80 ms | 125 MHz | 27–79 kHz | 55–90 Hz |
| 2.70 ms | Reserved | | |
| 3.90 ms | Reserved | | |
| 5.60 ms | Reserved | | |
| 8.20 ms | Reserved | | |
| 12.00 ms | Reserved | | |

TABLE 3-continued

| Pulse Width | Meaning BW | HSF | VSF |
|---|---|---|---|
| 18.00 ms | Reserved | | |
| 27.00 ms | Reserved | | |
| 39.00 ms | Reserved | | |

In Table 3, BW, HSF and VSF indicate bandwidth, horizontal sync frequency and vertical sync frequency, respectively.

It will be apparent that BIOS 214 advantageously allows measurement of the pulse width provided by monitor 100. Preferably, BIOS 214 includes configuration tables to permit selection of the proper operating parameters of graphics controller 200 to match the scan rate capabilities of monitor 100 and locating data to specify the storage location of one byte in memory 222. BIOS 214 advantageously includes firmware for implementing the watchdog timer function for identifying video display monitors which do not incorporate the present invention. The additional firmware advantageously can be provided in about 500 additional bytes of code. It will be noted that no firmware changes are required in monitor 100 according to this preferred embodiment of the present invention.

Figure 7:
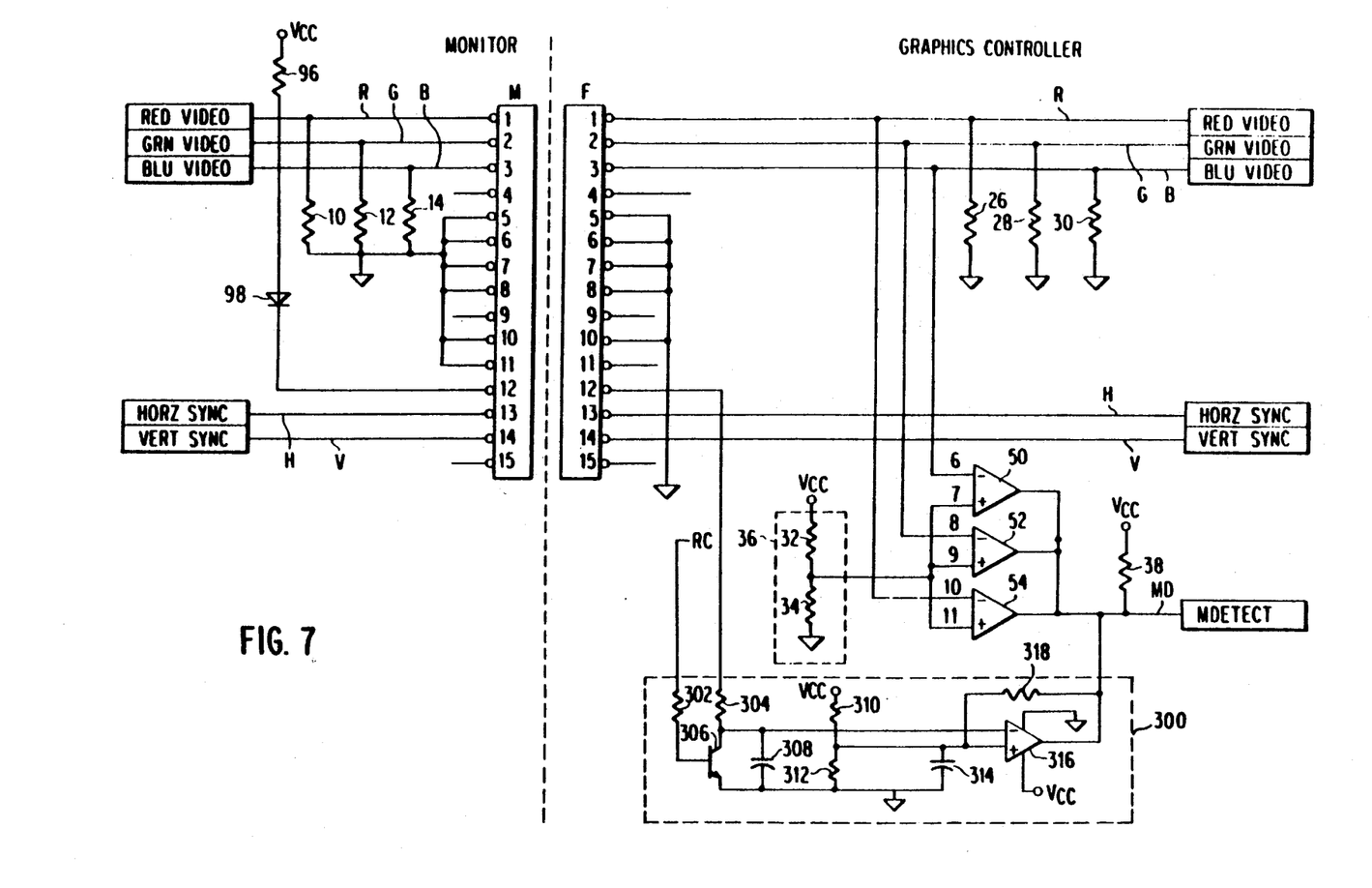
FIG. 7 is a schematic diagram showing connection circuitry between the video display monitor of FIG. 1 and the graphics controller of FIG. 2 for explaining the operation of still another preferred embodiment of the present invention.

Another preferred embodiment of the present invention is shown in FIG. 7, wherein the time constant of a RC network is used to provide an indication of monitor 100 capabilities for use by graphics controller 200. As shown in FIG. 7, monitor 100 according to this preferred embodiment includes a resistor 96 connected to pin 12 of connector M, i.e., the pin corresponding to line ID1, via a diode 98. Preferably, resistor 96 is a precision pullup resistor and diode 98 is an isolation diode. A different resistance value advantageously is used to identify each class of video display monitor Diode 98 advantageously disconnects line ID1 when the monitor is turned off, which allows monitor 100 to remain compatible with graphics controllers which expect line ID1 to float when the video display monitor is off.

On the graphics controller side of FIG. 7, a network 300 providing a timing function based on an RC network is connected between line ID1 and line MD such that differential comparators 50, 52 and 54 and network 300 are connected to the same port of I/O 206. Network 300 comprises a differential comparator 316 having its non-inverting input terminal connected to a biasing network comprising series connected resistors 310 and 312 and its inverting input connected to one terminal of a capacitor 308. A capacitor 314 is advantageously connected in parallel with resistor 312. A feedback resistor 318 is connected between the output of differential comparator 316 and its non-inverting input terminal. A switch element comprising transistor 306 is advantageously connected in parallel with capacitor 308, with the base of transistor 308 connected to one port of I/O 206 via a line RC. Preferably, capacitor 308 is connected to resistor 96 via line ID1 and a protective resistor 304. A second protective resistor 302 is also provided to protect transistor 306 from excessive voltages.

During operation, the output of network 300 is low whenever the voltage of capacitor 308 exceeds a predetermined voltage level. Preferably, the output of network 300 is low when capacitor voltage exceeds 2.5 volts. It will be noted that a high TTL signal applied to line RC causes transistor 306 to conduct, thus discharging capacitor 308 and producing an output from network 300 which is high. It will be apparent that resistor 96 and capacitor cooperatively set the time delay constant of network 300 and that changing the value of one of these elements changes to pulse width of the output signal produced by network 300.

In order to determine capabilities of monitor 100, BIOS 214 first blanks monitor 100 and then applies a high TTL signal to the port of I/O 206 which is advantageously connected to line RC, which causes capacitor 308 to discharge and the output of network 300 to go high. BIOS 214 starts a timer as soon as the high output of network 300 is noted on the port of I/O 206 connected to line MD. It will be apparent that determining the capabilities of monitor 100 can be performed either before or after determination of video display monitor type, i.e., monochrome or color, by conventional methods.

When the line MD goes low, BIOS 214 stops the timer and uses the timer value in conjunction with a table stored in BIOS 214 to determine monitor 100 capabilities. Preferably, the time constant of network 300 is within a range of about 60 μs and 13 ms. Resistance values for resistor 96 advantageously are selected from the values shown in Table 4, which provide a robust indication of monitor capabilities. Table 4 includes exemplary monitor 100 capabilities with respect to resistance values.

In Table 4, TC indicates time constant range produce by resistor 96 having the corresponding resistance value, while BW, HSF and VSF indicate the bandwidth, horizontal sync frequency and vertical sync frequency, respectively, of monitor 100. The resistance values included in Table 4 advantageously were selected taking into account voltage variations of +/−5%, an operating temperature range of 0°-120° F. and expected component variations.

TABLE 4

| Resistance | TC Min | TC Max | BW | HSF | VSF |
|---|---|---|---|---|---|
| <1.5 k | N/A | <60 μs | Illegal | | |
| 1.5 k | >60 μs | <225 μs | 75 MHz | 31–38 kHz 47.5–49 kHz | 55–90 Hz |
| 4.3 k | >225 μs | <555 μs | 75 MHz | 27–57 kHz | 55–90 Hz |
| 10.0 K | >555 μs | <1245 μs | 100 MHz | 27–65 kHz | 55–90 Hz |
| 22.1 k | >1245 μs | <2685 μs | 125 MHz | 27–79 kHz | 55–90 Hz |
| 47.5 k | >2685 μs | <5880 μs | Reserved | | |
| 110.0 k | >5880 μs | <13275 μs | Reserved | | |
| >110.0 k | >13275 μs | | Standard | VGA monitor | |

It will be apparent that the firmware requirements of this preferred embodiment of the present invention are essentially the same as that of the embodiment discussed with respect to FIG. 6. Thus, BIOS 214 advantageously is configured to provide a watchdog timer as well as the timer for detecting the time constant of network 300.

It will be appreciated that two or more of the preferred embodiments of the present invention advantageously can be combined to provide a more robust determination of the monitor's capabilities. For example, the preferred embodiments of FIGS. 4 and 7 can easily be combined since the signals indicative of the monitor's capabilities are transmitted via separate lines.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a computer system having a video display monitor connected to circuitry adapted to provide a video signal having a plurality of video signal characteristics including an analog video frequency, a horizontal sync frequency and a vertical sync frequency, a method for determining the video signal characteristics which the monitor will support comprising the steps of:

generating a first signal corresponding to the maximum video signal characteristics supported by the video display monitor in response to reception of a second signal corresponding to a video display monitor identification command; and sensing the first signal so as to permit determination of the maximum video display signal characteristics, wherein said second signal is a signal corresponding to a video mode change, wherein said first signal has a predetermined pulse width and wherein said sensing step comprises determining said pulse width of said first signal.

2. An apparatus for selecting one of a plurality of video signal characteristics including an analog video frequency, a horizontal sync frequency, and a vertical sync frequency produced by circuitry providing the video signal to a video display monitor, comprising:

a first circuit for generating a first signal responsive to a second signal corresponding to a command to set the characteristics of the video signal provided to the video display monitor; and a second circuit for sensing said first signal so as to permit identification of a set of operating characteristics of said video display monitor from a plurality of sets of predetermined operating characteristics, wherein said first circuit is a switch element for grounding a passive network so as to produce said first signal having a plurality of predetermined durations, each of said predetermined durations corresponding to said set of operating characteristics for said video display monitor and wherein said second circuit further comprises a timing circuit so as to permit determination of said duration of said first signal.

3. The apparatus of claim 2, wherein said first circuit comprises a resistor disposed in the video display monitor, said resistor being operatively coupled to a capacitor so as to permit said capacitor to be charged and discharged responsive to operation of said switch element.

4. The apparatus of claim 3, wherein said second signal is a digital signal.

* * * * *